May 19, 1936.  A. G. McNICOLL  2,041,363
ELECTRIC CLOCK THERMOSTAT
Filed Feb. 27, 1932  4 Sheets-Sheet 1

INVENTOR.
Andrew G. M<sup>c</sup> Nicoll,
BY
Hood & Hahn
ATTORNEYS

May 19, 1936. A. G. McNICOLL 2,041,363
ELECTRIC CLOCK THERMOSTAT
Filed Feb. 27, 1932 4 Sheets-Sheet 2
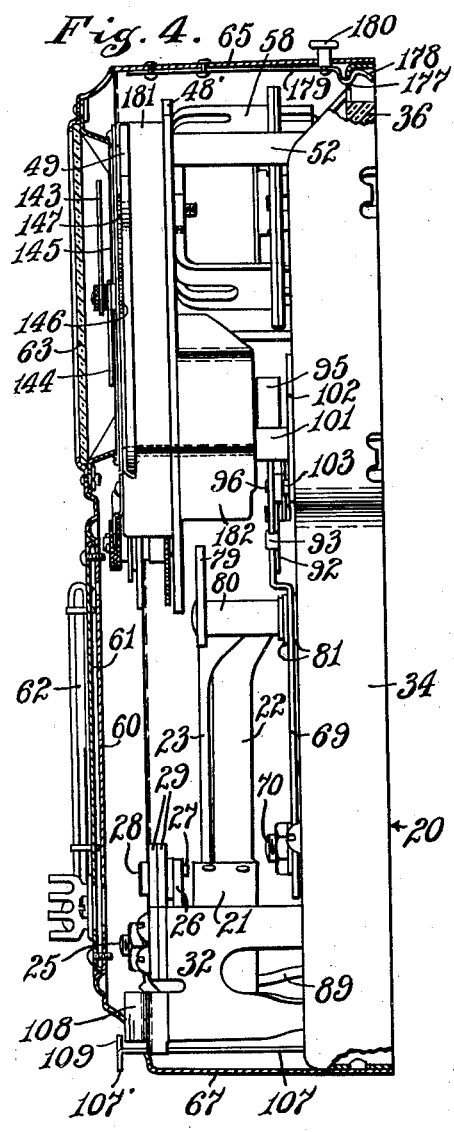
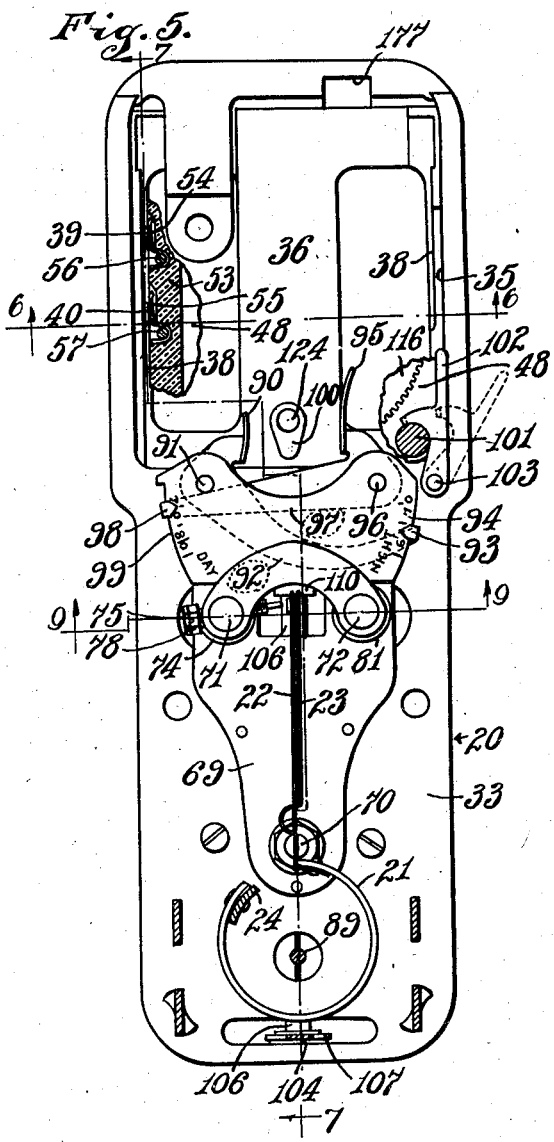
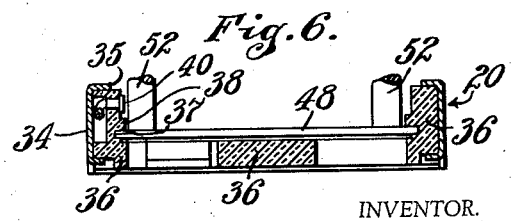
INVENTOR.
Andrew G. McNicoll,
BY
Hood + Hahn.
ATTORNEYS May 19, 1936.  A. G. McNICOLL  2,041,363
ELECTRIC CLOCK THERMOSTAT
Filed Feb. 27, 1932  4 Sheets-Sheet 3
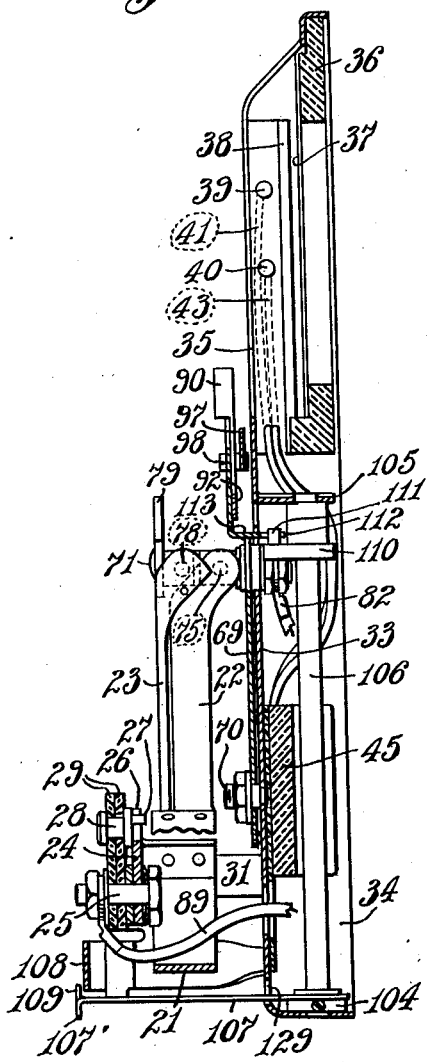
Fig. 7.
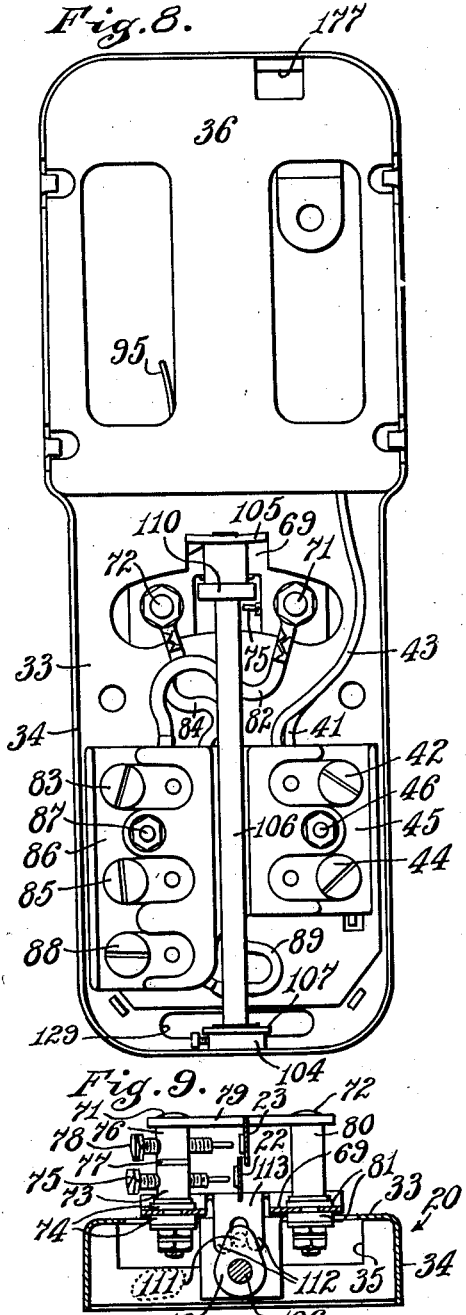
Fig. 8.
Fig. 9.
INVENTOR.
Andrew G. McNicoll,
BY
Hood + Hahn.
ATTORNEYS May 19, 1936.　　A. G. McNICOLL　　2,041,363
ELECTRIC CLOCK THERMOSTAT
Filed Feb. 27, 1932　　4 Sheets-Sheet 4
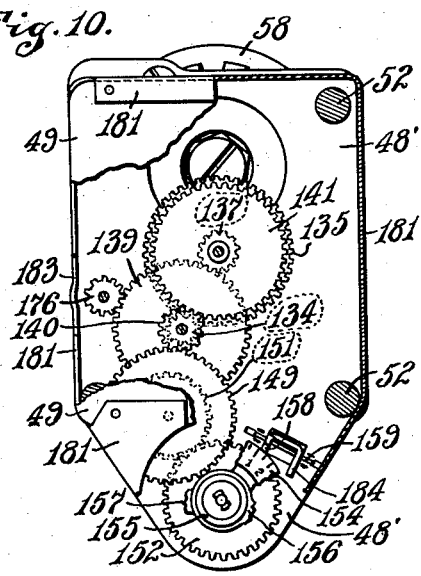
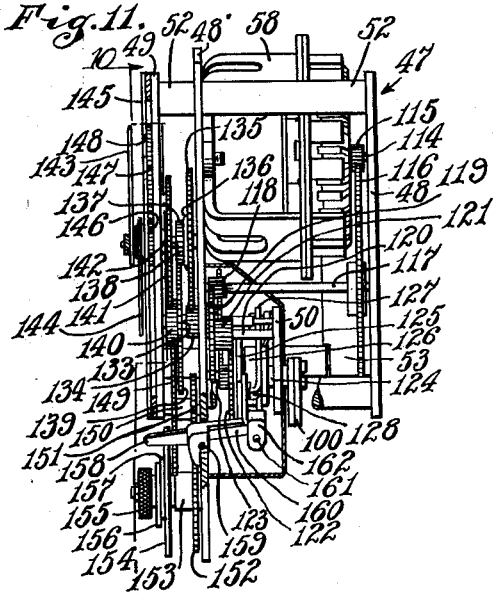
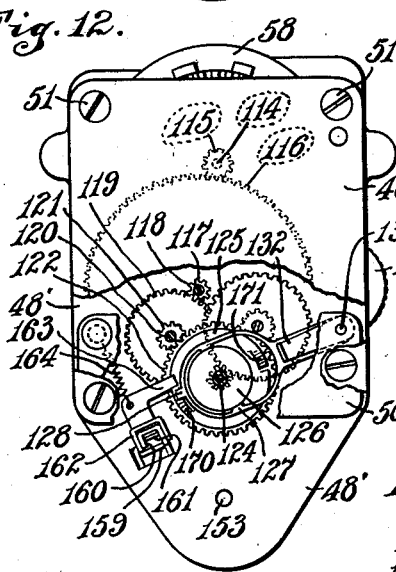
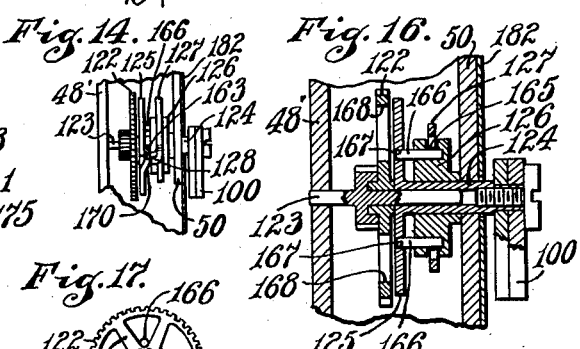
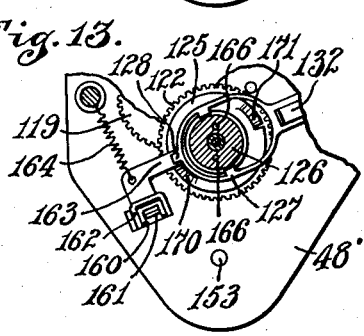
INVENTOR.
Andrew G. McNicoll,
BY
Hood + Hahn.
ATTORNEYS Patented May 19, 1936

2,041,363

UNITED STATES PATENT OFFICE 2,041,363

ELECTRIC CLOCK THERMOSTAT

Andrew G. McNicoll, Minneapolis, Minn., assignor to Minneapolis-Honeywell Regulator Company, Minneapolis, Minn., a corporation of Delaware Application February 27, 1932, Serial No. 595,460

13 Claims. (Cl. 200—139)

The present application relates to clock thermostats and, while many of the features of the present invention are applicable generally to clock thermostats, and some of such features are applicable to simple thermostats without time control, the invention includes certain features which particularly adapt the disclosed organization for use in connection with an electrically-driven time-control unit.

Among the objects of the present invention is the production of an electric clock thermostat so constructed as to reduce to a minimum the effect of the heat generated by the clock motor upon the thermo-responsive element of the organization. A further object of the invention is to provide a device of the character indicated so constructed that the whole time-control unit may be readily removed from the organization or assembled therewith without the necessity of disconnecting or connecting any wires. A further object of the invention is to provide, in an organization of the character indicated, an electric time-control unit removably associable with the adjustable thermo-responsive mechanism of the organization in such a manner that the mere association of the control unit with the thermo-responsive mechanism automatically establishes the necessary electrical connections for driving the control unit; and that the said control unit may be removed from the organization without separate manipulation of the electrical control connections.

A further object of the invention is to provide, in a device of the character indicated, mechanism whereby, at pre-determined time intervals, a constantly operating motor will be caused to shift an element of the thermostatic mechanism in one direction; and thereafter, after a pre-determined interval, to shift said element in the opposite direction; such mechanism including improved and simplified clutching mechanism.

A further object of the invention is to provide, in a device of the character indicated, a simplified gear train and operating mechanism between a constantly operating motor, clock hands, certain other rotatable indicators, and a thermostat-shifting mechanism.

A further object of the invention is to provide a simplified and improved manual adjustment for an element of the thermostatic mechanism.

Further objects of the invention will appear as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

Fig. 4 is a side elevation of the mechanism illustrated in Fig. 3, the shield or cover being shown in substantially central vertical section;

Fig. 5 is a front elevation of the base of the mechanism illustrated in Fig. 3, broken fragments of the time-control unit being shown in association therewith;

Fig. 6 is a section, taken substantially on the line 6—6 of Fig. 5 and looking in the direction of the arrows, the time-control unit being shown partially assembled therewith;

Fig. 7 is a section taken substantially on the line 7—7 of Fig. 5, and looking in the direction of the arrows, the time-control unit having been removed;

Fig. 8 is a rear elevation of the base;

Fig. 9 is a section taken substantially on the line 9—9 of Fig. 5, looking in the direction of the arrows;

Fig. 10 is a section through the time-control unit taken substantially on the line 10—10 of Fig. 11 and looking in the direction of the arrows, parts being broken away for clarity of illustration;

Fig. 11 is a side elevation of the time-control unit, certain parts being broken away for clarity of illustration;

Fig. 12 is a rear elevation of the time-control unit, parts being broken away for clarity of illustration;

Fig. 13 is a fragmental view of certain of the parts illustrated in Fig. 12, such parts being shown in another position of operation;

Fig. 14 is a fragmental side elevation of a portion of the clutch actuating mechanism;

Fig. 15 is an enlarged plan of the mechanism illustrated in Fig. 14;

Fig. 16 is a section taken substantially on the line 16—16 of Fig. 15; and

Fig. 17 is a front elevation of a detail.

Figure 1:
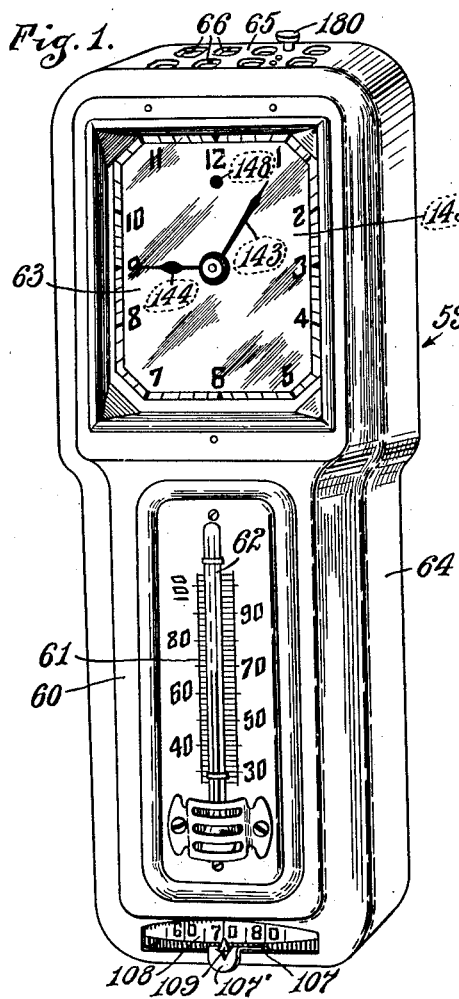
Fig. 1 is a perspective view of an embodiment of the present invention.

Referring, first, to Fig. 4, it will be seen that I have illustrated an electric clock thermostat comprising a metallic base indicated generally at 20, with which is associated a thermo-responsive element 21 of the well known volute type. In the particular embodiment illustrated, said element 21 includes a pair of spring fingers 22 and 23, but it will be obvious that, without affecting the present invention, any other well known type of thermo-responsive contactor might be substituted for said element 21 with its fingers 22 and 23.

Said element 21 is supported upon a bracket 24 (Figs. 3, 5, and 7) which, in turn, is pivotally mounted upon a pin or bolt 25. Said bracket 24 is preferably provided with a bifurcated ear 26 between the furcations of which is received an eccentrically positioned pin 27 carried by an element 28 rotatably mounted in a bridge piece 29 in which the pin 25 is likewise mounted. It will be obvious that rotation of the element 28 will result in bodily adjustment of the position of the thermo-responsive element 21.

Figure 3:
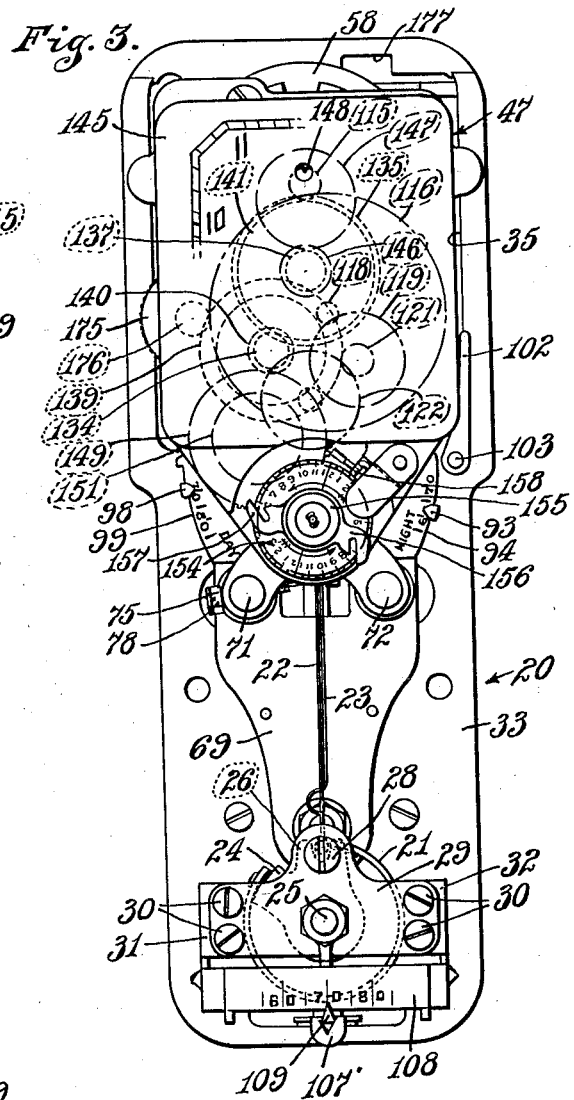
Fig. 3 is a front elevation thereof, the shield or cover having been removed, and certain of the indicia of the clock dial having been erased for clarity of illustration.

The bridge piece 29 is preferably formed of heat-insulating material supported at some distance from the base 20 by a pair of brackets 31 and 32, said bridge piece being secured to said brackets through the medium of screws 30 (see Fig. 3).

In its preferred embodiment, the base 20 comprises a metallic plate 33 provided with a perimetral flange 34 (Fig. 7) forming, with said plate, a quasi-housing in which certain elements later to be described are received. Adjacent its upper end, the plate 33 is cut away as at 35 to form a socket the base of which is formed by a block 36 of heat-insulating material. The bridge piece 29 and the block 36 are both preferably formed of some molded material having high insulating qualities with regard both to heat and to electricity.

Referring to Figs. 6 and 7, it will be seen that the block 36 is formed in opposite sides with a pair of parallel grooves or guideways 37, the forward edges of which are guarded by vertically extending ribs 38, and said guideways are open at their upper ends. Adjacent one of the guideways 37 there are set into the block 36 a pair of contacts 39 and 40. The contact 39 is permanently connected by a wire 41 with a terminal 42, while a wire 43 permanently connects the contact 40 with a second terminal 44, said terminals 42 and 44 being set into a block 45 of insulating material received within the above-mentioned housing and secured in place by a bolt 46, or the like.

A time-control unit, indicated generally at 47 in Fig. 11, comprises plates 48, 48', 49, and 50, suitably connected together by screws 51 and spaced from each other by spacer sleeves 52, said plates forming a frame upon which are hung the various elements of the time-control unit. A block 53 (Figs. 5 and 11) of insulating material is mounted upon the plate 48, and a pair of spring contacts 54 and 55 are set into the outer lateral surface of said block 53. Wires 56 and 57 respectively associated with said contacts 54 and 55 lead to the terminals of a constant-speed motor 58. The block 53 and the contacts 54 and 55 are so positioned that, when the time-control unit is slid home in its socket, the edges of the plate 48 being guided in the grooves 37, the contact 54 will engage the contact 39, and the contact 55 will engage the contact 40. It will thus be seen that, if the terminals 42 and 44 are connected to a source of electrical energy, the mere act of sliding the time-control unit into place will establish a suitable connection between the motor 58 and said source of energy; and that the time-control unit may be removed for repair or replacement without disconnecting any wires or other manually manipulated connections.

It will also be seen that the present arrangement is such that there is no metallic path through which the heat generated by the operation of the motor 58 may flow to the thermo-responsive element 21 to affect the same. However, a device consisting merely of the elements illustrated in Fig. 3 would be entirely unsatisfactory, not only because its appearance would be objectionable, but because of the fact that delicate parts would be subjected to the possibility of damage from blows and to an excessive deposit of dirt. Consequently, it is essential to shield a device of this character in a suitable cover or housing. With a housing of the ordinary construction in place, the heat of the motor 58 would be somewhat confined, whereby the air within the housing would be raised, at times, to a temperature much too far above room temperature for satisfactory thermostat operation. Furthermore, with a housing of ordinary construction, the temperature variation between the interior of the housing and room temperature would fluctuate through a wide range depending upon conditions of circulation and other conditions. It is an object of the present invention to provide means whereby that temperature difference shall be held at as low a value as possible, and further shall be held as constant as possible.

Figure 2:
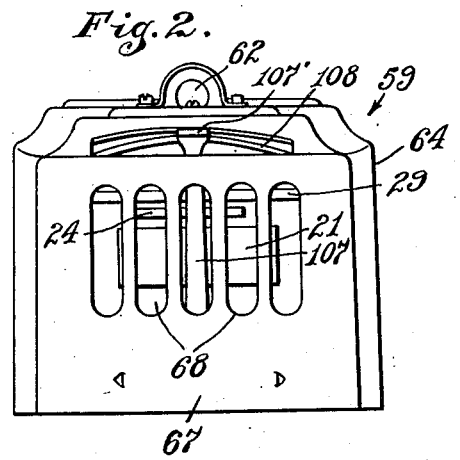
Fig. 2 is a bottom plan thereof.

A housing constructed in accordance with the present invention is indicated generally at 59 in Figs. 1 and 2. Said housing comprises a front panel 60 upon which is mounted a thermometer scale 61 carrying a thermometer 62; and which is apertured adjacent its upper end to receive a crystal 63 through which the clock dial 145 is visible. Said housing includes likewise a perimetral flange 64 adapted to fit over the base 20 and to enclose said base and all of the mechanism mounted thereon.

According to the present invention, the side walls of the flange 64 are imperforate, as is also the front panel 60, except for an opening adjacent the lower end thereof. The upper wall 65 of said flange is formed with a plurality of apertures 66, and the lower wall 67 thereof is formed with a plurality of apertures 68. Because of the fact that the only openings in the housing 59 are at the upper and lower ends thereof, the heat generated by the motor 58 is put to work to assist in overcoming the disadvantages which arise because of the generation of that heat. The housing 59 acts, upon generation of heat by the motor 58, as a chimney; whereby a draft is set up moving upwardly through the apertures 68, and over the thermostatic element 21, and thence over the motor 58 and out through the apertures 66. Conduction of heat through the air from the motor 58 downwardly toward the thermostatic element 21 is thus positively prevented, and a stream of air is positively drawn from the room and caused to flow across the thermo-responsive element 21.

Tests have shown that, as a result of this construction, the temperature of the air immediately adjacent the thermo-responsive element 21 is held with a considerable degree of constancy at a value very slightly above room temperature.

Referring, now, most particularly to Figs. 3, 5, 7, and 9, it will be seen that a plate 69 is mounted upon the plate 33, being pivoted thereto at its lower end upon a pin 70. Intermediate its ends, said plate carries a post 71 and, spaced laterally from said post 71, a second post 72. The post 71 is suitably insulated by washers 74 from the plate 69, and carries a sleeve 73 through which is adjustably threaded a contact element 75. Said post also carries a second metallic sleeve 76 suitably insulated from said post and from said sleeve 73, by an insulating member 77. The sleeve 76 carries an adjustable contact member 78. A bar 79 provides an electrical connection between the sleeve 76 and a sleeve 80 carried upon, and electrically connected to, said post 72, said post and sleeve being suitably insulated from the base 69 by washers 81. The contact element 75 is adapted to be contacted by the finger 22; and the contact element 78 is adapted to be contacted by the finger 23. A wire 82 (Fig. 8) permanently connects the post 71 with a terminal 83; and a wire 84 permanently connects the post 72 with a terminal 85, said terminals 83 and 85 being set in a block 86 of insulating material suitably secured by a bolt 87, or the like, in the housing formed by the base 20. Said block 86 likewise carries a terminal 88 to which is permanently connected one end of a wire 89, the opposite end of which is connected to the pin 25, and thereby to the thermo-responsive element 21 and the fingers 22 and 23.

Since the present invention relates to thermostats of the type in which the position of the contact elements 75 and 78 is adapted to be automatically adjusted by a time-control unit, with respect to the thermo-responsive element, means must be provided for cooperation with said time-control unit to effect such adjustment; and preferably, such means should be adjustable, to the end that the movement of the contact elements with respect to the thermo-responsive element, upon actuation by the time-control unit, shall be variable at the will of the user. Mechanism of such character has been provided in the device of the present application, and is illustrated most clearly in Fig. 5. A shoe 90 is carried upon one arm of a lever 92, said lever being pivoted at 91 to the plate 69. The opposite arm of said lever 92 carries an indicator 93 associated with a scale 94. A second shoe 95 is positioned in opposition to the shoe 90 and is carried by one arm of a lever 97 pivoted at 96 to the plate 69. The opposite arm of said lever 97 carries an indicator 98 associated with a second scale 99. It may here be noted that the levers 92 and 97 are tightly pivoted to the plate 69, so that they are movable about their pivots only with difficulty; while the plate 69 is loosely pivoted to the plate 33, so that it is relatively easily movable about its pivot.

The time-control unit 47 includes a cam element or lever 100 which, when the time-control unit is seated in the socket of the base, is positioned between the shoes 90 and 95, as is clearly illustrated in Fig. 5.

When said time-control unit is so seated, an element 101 thereof is so positioned as to be engageable by the hook of a latch arm 102 pivoted at 103 on the plate 33.

The scale 94 is marked "Night"; and the scale 99 is marked "Day". If the indicator 93 is moved to a position wherein it points to a temperature which it is desired to maintain during those hours when the owner is sleeping; and if the indicator 98 is set to a position to indicate on the scale 99 the temperature which it is desired to maintain during the waking hours of the owner, the time-control unit will automatically so position the plate 69 and consequently the contacts 75 and 78 that the temperatures indicated by the indicators 93 and 98 will be maintained during such periods, in the absence of manual adjustment of the plate 69.

The mechanism for effecting such manual adjustment is illustrated most clearly in Figs. 7 and 8. Journalled in a step 104 and in an ear 105 is a rock shaft 106, said shaft being enclosed within the base housing. At its lower end, said rock shaft carries an arm 107 projecting through a slot 129 formed in the base plate 33, and terminating in a down-turned finger piece 107' and an up-turned indicator 109, said indicator being positioned to sweep a graduated scale 108.

Adjacent its upper end, the rock shaft 106 carries an arm 110 provided with a pin 111 engaging between the furcations 112 of a rearwardly projecting finger 113 on the plate 69. Obviously, if the arm 107 is moved in one direction or the other, the arm 110 will be correspondingly moved, and the pin 111 will enforce corresponding movement of the plate 69 about its pivot 70, thereby adjusting the relation of the contacts 75 and 78 to the fingers 22 and 23 of the thermo-responsive element 21.

The details of the time-control unit are illustrated in Figs. 11 to 17 inclusive, and in Fig. 3. The motor 58 is suitably mounted upon the plate 48', and the spindle 114 of said motor carries a pinion 115 meshing with a gear 116. Said gear 116 is preferably formed of fiber in order to reduce the noise of operation, and is carried upon a shaft 117 journalled between the plates 48 and 48'. Said shaft likewise carries a pinion 118 meshing with a gear 119 carried upon a shaft 120. Likewise fast upon the shaft 120 is a pinion 121 meshing with a gear 122 on a shaft 123. At one end, said shaft 123 is journalled in the plate 48', and at its opposite end, said shaft is telescoped within a hollow shaft 124 journalled intermediate its ends in the plate 50. Said shaft 124 is formed with, or carries, a cam element 125; and splined on said shaft 124 is a clutch member 126 with which cooperates a yoke 127. Said yoke 127 is extended as a finger the extremity of which is loosely secured to the plate 50 by a screw, or the like, 131, the arrangement being such as to permit movement of said member 127 in a direction parallel to the axis of the shaft 124. A leaf spring 132 urges said member 127, and consequently said clutch member 126, toward the cam element 125. Said member 127 is provided with a finger 128 projecting in a direction parallel to the axis of the shaft 124, and said spring 132 holds said finger 128 always in contact with said cam element 125.

Suitable gears of more or less conventional arrangement are provided whereby a shaft 133 is constantly driven from the motor 58. Said shaft 133 carries a pinion 134 meshing with a gear 135 loose on a shaft 138. A spring washer 136 is compressed between the gear 135 and a pinion 137 fast on the shaft 138 whereby said pinion 137 and shaft 138 are normally driven synchronously with the gear 135. Said pinion 137 meshes with a gear 139 integral with a pinion 140 which meshes with a gear 141 fast on a sleeve 142 which is journalled on the shaft 138. A minute hand 143 is fast on the shaft 138, and an hour hand 144 is fast on the sleeve 142, said hands being positioned to sweep a clock dial 145 mounted on, but slightly spaced from, the plate 49.

The sleeve 142 carries a pinion 146 which meshes with a gear 147, said gear being in the form of a disc divided into two equal segments, one being light in color and the other being dark in color. The ratio of the pinion 146 to the gear 147 is such that the gear 147 is turned through one complete revolution in twenty-four hours, and a peep hole 148 is formed in the clock dial 145 through which a small portion of the disc 147 is constantly visible.

The clock hands are so related to the disc 147 that, at twelve o'clock noon and at twelve o'clock midnight, the dividing line between the two segments of the disc 147 vertically bisects the hole 148.

A gear 149 mounted on a shaft 150 likewise meshes with the pinion 140, and said shaft 150 carries a second gear 151 meshing with a gear 152 carried on a shaft 153, said shaft likewise carrying a dial 154. The ratio through the train 140—152 is such that the dial 154 is turned through one complete revolution in twenty-four hours. Said dial 154 is divided into two equal segments, and each segment is graduated and numbered from 1 to 12, as is clearly illustrated in Fig. 3. One-half of the dial 154 is light in color and the other half is dark in color; and said dial is so related to the clock hands that, at twelve o'clock noon and at twelve o'clock midnight, the dividing line between the two segments is positioned in registry with a lever arm 158, later to be described.

A knurled nut 155 is threaded on the shaft 153 and is adapted to be turned up to clamp in adjusted position two individually adjustable actuator fingers 156 and 157 clearly illustrated in Figs. 3 and 11. Said fingers 156 and 157 are of conventional construction, and consequently are not herein described in detail.

One arm 158 of a trip lever is positioned for actuation by the fingers 156 and 157, said lever being pivoted at 159 in the plate 48'. The opposite arm 160 of said lever carries a pivot pin 161 upon which is pivotally mounted a trigger 162 having an arm 163 (see Figs. 12 to 14) operatively associated with the cam element 125. A contractile spring 164 is suitably anchored at its one end and is connected to said trigger 162 at its opposite end, whereby the lever is urged to the position illustrated in Fig. 11, in which a lug 184 (Fig. 10) formed on said lever engages the plate 48' to limit movement of the lever under the influence of the spring 164.

Referring, now, to Fig. 16, it will be seen that the clutch member 126 is formed with a peripheral groove 165 in which the element 127 engages. Said member 126 carries a pair of pins 166 the projecting ends of which are received in apertures 167 in the cam element 125, whereby said clutch member and cam element are locked against relative rotation. In the position of Fig. 16, there is no driving engagement between the shaft 123 and the shaft 124.

The gear 122 may be considered a second clutch member with which the member 126 cooperates to effect a driving connection between the shaft 123 and the shaft 124. When the clutch member 126 is moved toward the left, as viewed in Fig. 16, under the influence of the spring 132, the pins 166 are projected into the spaces 168 between the spokes 169 of the gear 122, whereby said gear and said clutch member 126 are locked against relative rotation.

The cam element 125 is formed with two diametrically opposite cam surfaces 170 and 171 gradually rising from the surface 174 of said cam element 125 to positions spaced from said surface a distance substantially equal to the distance from the left-hand face of the gear 122 to the left-hand face of the cam element 125, as viewed in Fig. 16. Said cam surface 170 terminates in a sharply dropping shoulder 172, and said cam surface 171 terminates similarly in a sharply dropping surface 173. The finger 128 of the element 127 is so positioned as to ride upon these cams so that, when the cam element is in the position illustrated in Figs. 11, 12, 14, and 15, the spring 132 will be compressed, and the clutch element 126 will be held in such a position that the pins 166 are completely withdrawn from the gear 122.

Under these circumstances, of course, the shaft 124 and the actuating lever or cam 100 will not be driven as the motor 58 operates. This is the normal condition of the control unit.

In Fig. 3, the finger 156 is set to actuate the lever arm 158 at 7:30 P. M. As the motor 58 operates to drive the gear train and the clock hands, the dial 154 will be rotated, and at approximately six o'clock, the finger 156 will come into contact with the arm 158 and begin to move the same against the tendency of spring 164. As the lever arm 158 is rocked in a clockwise direction as viewed in Fig. 11, the finger 163, engaging the end 172 of the cam portion 170 slowly moves the cam element 125 in a counter-clockwise direction as viewed in Fig. 12. As the dial 154 continues to rotate, the cam element is moved to such a position that the surface 170 is moved past the finger 128 of the element 127. The element 127 is not permitted to move, however, at this time because the finger 163 is interposed between the finger 128 and the surface 174 of the cam element 125. At exactly 7:30, the following extremity of the finger 156 will desert the arm 158, and the arm 158 will thereupon drop to the position of Figs. 3, 11, and 12, under the influence of the spring 164, whereby the finger 163 is removed from between the finger 128 and the cam element 125. Thus the spring 132 will be permitted to urge the finger 128 into contact with the surface 174 of the cam element 125, whereby the pins 166 will be projected into two of the spaces 168 between the spokes 169 of the gear 122.

The gear ratio between the motor 58 and the shaft 123 is such that said shaft 123 makes one-half revolution in one minute. As the shaft 123 rotates, carrying with it the shaft 124, the actuator 100 is moved into engagement with the shoe 90 and, as said actuator continues to move, the plate 69 is forced to move in a counter-clockwise direction about its pivot 70 until it reaches the position at which the actuator 100 leaves its engagement with the shoe 90. Of course, as the plate 69 is thus moved, the ear 113 drives the pin 111 and arm 110 to oscillate the rock shaft 106 to shift the arm 107 and indicator 109 with respect to the scale 108.

As the shaft 124 rotates, the cam element 125 is carried with it; and as said cam element nears the end of one-half revolution, the cam surface 171 thereof rides under the finger 163, whereby the trigger 162 is rocked about its axis 161. Almost concurrently, the cam surface 171 rides under the finger 128 of the element 127 whereby, as rotation of the cam element 125 continues, the element 127 and the clutch 126 are slowly backed away; whereby the pins 166 are withdrawn from their engagement between the spokes 169 of the gear 168. The parts are so correlated that, at the instant when the finger 163 drops off the end 173 of the cam surface 171, withdrawal of the pins 166 is complete, and the parts come to rest in the positions illustrated in Figs. 12, 14, and 16 where they remain until the lever arm 158 is actuated by the finger 157, or until said arm is manually actuated.

Similarly, the finger 157 is shown, in Fig. 3, in a position to actuate the lever arm 158 at approximately 5:50 A. M. Shortly after 4:00 A. M., said finger 157 will come into contact with the arm 158 and begin to move the same, whereby the finger 163 is caused to cooperate with the end 173 of the cam portion 171 to move the cam element 125. When, at 5:50 A. M., the lever arm 158 drops the following end of the finger 156, the spring 132 will force the pins 166 into engagement between spokes of the gear 122, whereby the shaft 124 and cam 125 will be driven synchronously with said gear 122.

As the shaft 124 is rotated, the actuator 100 is moved into contact with the shoe 95, and continued movement of the actuator 100 will force said shoe 95 into the position illustrated in Fig. 5, thus shifting the contact elements 75 and 78 to positions wherein they will be contacted by the fingers 22 and 23 at a temperature substantially corresponding to that indicated by the indicator 98 on the scale 99.

As the actuator 100 approaches the position illustrated in Fig. 5, the fingers 163 and 128 ride up on the cam surface 170 whereby, just as the finger 163 drops off the end 172 of said cam portion 170, withdrawal of the pins 166 from their engagement between spokes of the gear 122 will be completed, and rotation of the shaft 124 and its connected elements will stop.

For setting the clock, there is provided a thumb wheel 175 with which is rigid a pinion 176 meshing with the gear 139. It will be obvious that, as the thumb wheel 175 is operated, only that portion of the gear train which is separated from the motor 58 by the spring washer 136 will be driven, slip taking place between the gear 135 and the pinion 137.

The housing 59 is held in place on the base 20 in the manner illustrated in Fig. 4. Adjacent its upper end, said base is formed with a notch 177 adapted to receive the latch end 178 of a spring finger 179, a button 180 being provided for depressing said spring finger.

Preferably, the gear trains and clutch mechanism are enclosed within housings 181 and 182, the housing 181 being formed with a notch 183 permitting the projection of the thumb wheel 175.

I claim as my invention:

1. A device of the class described comprising a metal base, a piece of heat-insulating material carried by said base adjacent the upper end thereof, an electric motor mounted on said piece, a piece of heat-insulating material carried by said base adjacent the lower end thereof and spaced from said base, a thermostatic element mounted on said piece, the pieces of heat insulating material reducing the conduction of heat through the metal base from the clock to the thermostat and a housing mounted on said base and enclosing said motor and said thermostatic element, said housing being formed with perforations only in its top and bottom surfaces.

2. In combination, a base, a portion of said base being formed of electrical insulating material, a pair of terminals on said base for relatively permanent connection to a source of electrical energy, a pair of spaced contacts on the insulating portion of said base permanently connected to said terminals, a pair of guideways on the insulating portion of said base, a frame having guides cooperable with said guideways, a motor carried by said frame, a block of electrical insulating material carried by said frame, and a pair of contacts carried by said block, and permanently connected to the terminals of said motor, whereby, when said frame guides are slid into position with respect to said base guideways, said block contacts will cooperate with said base contacts to establish electrical connection between said base terminals and said motor terminals.

3. In combination, a base provided with a pair of parallel rails of insulating material formed with facing grooves, a plurality of electrical contacts mounted on said base and insulated from each other, said contacts being relatively permanently connected to a source of electrical energy, and a unit having guides slidably receivable in said grooves and including a motor and a plurality of spaced contacts respectively permanently connected with the terminals of said motor, said unit contacts being insulated from each other and being arranged to contact respectively said base contacts when said unit guides are seated in said grooves.

4. An electric clock thermostat comprising a base, a temperature-responsive unit mounted on said base and comprising a thermostatic element, a contact operatively associated therewith, and a time-controlled unit removably associated with said base, said unit comprising an electric motor, a member operatively associable with said temperature-responsive unit, and a plurality of contacts permanently connected to the windings of said motor, a plurality of contacts on said base relatively permanently connected to a source of electrical energy and positioned to be engaged by said time-control-unit contacts when said time-control unit is in position on said base, and cooperating means on said base and on said time-control unit automatically effective, when said time-control unit is associated with said base, to vary periodically the relative positions of said thermostatic element and its associated contact.

5. In combination, a base, an element pivoted on said base, a rock shaft mounted on said base and carrying an arm adjacent each end, and interengaging means on the free end of said element and on one of said arms providing a driving connection between said rock shaft and said element, the other of said arms projecting through a suitably formed slot in said base.

6. In a thermostat, a base, a thermo-responsive member suitably carried on said base, a plate pivoted on said base and carrying, adjacent its free end, a contact adapted to be contacted, at times, by said thermo-responsive member, a rock shaft mounted on said base, a graduated scale carried by said base, an arm on said rock shaft and cooperating with said scale, a second arm on said rock shaft, and interengaging means on said plate and on said second arm providing a driving connection between said rock shaft and said plate, whereby shifting of said first arm with respect to said scale results in shifting of said contact with respect to said thermo-responsive member.

7. An electric clock thermostat, comprising, in combination, a base including a pair of electric terminals, switching means carried by said base, thermostatic means in control of said switching means, timing means associated with said switching means and thermostatic means for changing the action of the latter upon the former and including an electric motor and a pair of motor terminals, and connecting means for removably mechanically and electrically connecting said timing means and its terminals to the base and its terminals.

8. An electric clock thermostat comprising, in combination, a base including a pair of electrical terminals, a switch carried by said base, a thermostatic element for operating said switch, timing means for varying the temperature at which the thermostatic element operates said switch, said timing means including an electric motor and a pair of motor terminals, and means loosely supporting said timing means upon said base with the base terminals and motor terminals in engagement.

9. An electric clock thermostat, comprising, in combination, a base including a block of heat and electrical insulating material, a pair of terminals carried by said block and relatively permanently connected to a source of electrical energy, timing means including an electric motor and a pair of motor terminals, means loosely supporting the timing means on said block with the motor terminals in contact with the block terminals, thermostatic switching means carried by said base, and operative connections between said timing means and thermostatic switching means.

10. An electric clock thermostat, comprising, in combination, a base including a block of heat and electrical insulating material, a pair of terminals carried by said block and relatively permanently connected to a source of electrical energy, timing means including an electric motor and a pair of motor terminals, connecting means loosely and removably securing said timing means to said block with the motor terminals in contact with the block terminals, a switch carried by said base, a thermostatic element for operating said switch, and operative connections between said timing means and said thermostatic means through which the timing means is operative to change the temperature at which the thermostatic element operates said switch.

11. An electric clock thermostat, comprising, in combination, an elongated base including a block of heat and electrical insulating material mounted near the upper end thereof, a thermostatic element mounted near the lower end of said base, a switch controlled thereby, timing means including an electric motor adapted to be associated with said switch for changing the action of the thermostatic element thereon, a pair of motor terminals carried by said timing means, a pair of terminals carried by said block and relatively permanently connected to a source of electrical power, connections enabling removable mounting of the timing means on the block with the motor terminals in contact with the block terminals, and a cover adapted to surround said thermostatic element and timing means and being provided with ventilating openings in the top and bottom.

12. In combination, a base, a portion of said base being formed of electrical insulating material, a pair of facing guideways formed in said insulating material, a pair of terminals on said base for relatively permanent connection to a source of electrical energy, a pair of spaced contacts located on the insulating portion of said base adjacent one of said guideways and spaced longitudinally thereof and permanently connected to said terminals, a frame having guides cooperable with said guideways, a motor carried by said frame, a block of electrical insulating material carried by said frame, and a pair of contacts carried by said block, and permanently connected to the terminals of said motor, whereby, when said frame guides are slid into position with respect to said base guideways, said block contacts will cooperate with said base contacts to establish electrical connections between said base terminals and said motor terminals.

13. In combination, a base, a portion of said base being formed of electrical insulating material, a pair of facing guideways formed in said insulating material, a pair of terminals on said base for relatively permanent connection to a source of electrical energy, a pair of spaced contacts located on the insulating portion of said base adjacent one of said guideways and spaced longitudinally thereof and permanently connected to said terminals, a frame having guides cooperable with said guideways, a motor carried by said frame, a block of electrical insulating material carried by said frame, and a pair of contacts carried by said block, spaced longitudinally of one of said guides, and permanently connected to the terminals of said motor, whereby, when said frame guides are slid into position with respect to said base guideways, one of said block contacts is moved across one of said base contacts and into engagement with the other of said base contacts, while the other of said block contacts is moved into engagement with said first-mentioned one of said base contacts.

ANDREW G. McNICOLL.